(12) United States Patent
Borthakur et al.

(10) Patent No.: US 7,693,859 B2
(45) Date of Patent: *Apr. 6, 2010

(54) SYSTEM AND METHOD FOR DETECTING FILE CONTENT SIMILARITY WITHIN A FILE SYSTEM

(75) Inventors: Dhrubajyoti Borthakur, San Jose, CA (US); Nur Premo, San Jose, CA (US); Joseph Pasqua, Menlo Park, CA (US)

(73) Assignee: Symantec Operating Corporation, Mountain View, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 11/712,271

(22) Filed: Feb. 28, 2007

(65) Prior Publication Data

US 2007/0168320 A1 Jul. 19, 2007

Related U.S. Application Data

(63) Continuation of application No. 10/723,698, filed on Nov. 26, 2003, now Pat. No. 7,188,118.

(51) Int. Cl.
*G06F 17/00* (2006.01)
(52) U.S. Cl. ............................. 707/101; 707/1; 707/10
(58) Field of Classification Search ................. 707/101, 707/1, 10; 341/51
See application file for complete search history.

(56) References Cited

U.S. PATENT DOCUMENTS 5,561,421 A * 10/1996 Smith et al. .................... 341/51
5,586,280 A    12/1996 Simms
5,729,228 A     3/1998 Franaszek
5,850,565 A    12/1998 Wightman
6,247,015 B1    6/2001 Baumgartner
6,522,268 B2    2/2003 Belu
7,026,962 B1 *  4/2006 Emami et al. ................. 341/51
7,155,465 B2   12/2006 Lee

OTHER PUBLICATIONS

Benedetto, et al, "Language Trees and Zipping", Physical Review Letters, Internet, Jan. 2002, http://arxiv.org/abs/cond-mat/0108530.
"Data Compression and Learning in Time Sequences Analysis", Puglisi, et al; Physica D, vol. 180, pp. 92-107, Jan. 2003.
"Faster and Better Decision-Making Through Unstructured Data Management (UDM)", Kasravi, http://web.archive.org/web/20030623024547//http://www.eds.com/thought/news_thought_..., downloaded from Internet, Jun. 2003.

* cited by examiner

*Primary Examiner*—Apu M Mofiz
*Assistant Examiner*—Cindy Nguyen
(74) *Attorney, Agent, or Firm*—Meyertons, Hood, Kivlin, Kowert & Goetzel, P.C.; Anthony M. Petro

(57) ABSTRACT

A system and method for detecting file content similarity within a file system. The system may include a storage device configured to store a plurality of files and a file system configured to manage access to the storage device. The file system may be configured to compute a compressed size of at least a portion of a given file, and to store an indication of the compressed size in a named stream corresponding to the given file. In one specific implementation of the system, the file system may be further configured to determine a value of a file harmony metric from the compressed size of the concatenation of a first and second file and the compressed sizes of the first and second files, where the compressed sizes of the first and second files may be stored in a corresponding one of a plurality of respective named streams.

21 Claims, 6 Drawing Sheets

SYSTEM AND METHOD FOR DETECTING FILE CONTENT SIMILARITY WITHIN A FILE SYSTEM

This application is a continuation of U.S. patent application Ser. No. 10/723,698, entitled "SYSTEM AND METHOD FOR DETECTING FILE CONTENT SIMILARITY WITHIN A FILE SYSTEM", filed Nov. 26, 2003 now U.S. Pat. No. 7,188,118.

BACKGROUND OF THE INVENTION

1. Field of the Invention

This invention relates to computer systems and, more particularly, to storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

In many conventional file-based computer systems, files may be created, destroyed and manipulated with relatively few constraints. Typically, files may be arbitrarily named, subject to operating system conventions, and often, unlimited numbers of exact copies of existing files may be made with ease, subject only to available storage capacity. While such ease of data proliferation may simplify system operation for the user, it may also result in inefficient use of storage devices and difficulties in data management. For example, storage devoted to multiple identical copies of a given file may be redundant and therefore wasted, but it may not be apparent that the copies are in fact identical. Similarly, two given files may be mostly identical in content without being apparently related on the basis of, e.g., file name. In some cases, files may be similar in information content but encoded in different formats, rendering a simple bitwise comparison of files uninformative. Generally speaking, although files may be created and their content modified arbitrarily, useful content relationships among various files may exist, even though such relationships may not be obvious from conventional file characteristics such as file names.

SUMMARY OF THE INVENTION

Various embodiments of a system and method for detecting file content similarity within a file system are disclosed. In one embodiment, the system may include a storage device configured to store a plurality of files and a file system configured to manage access to the storage device. The file system may be configured to compute a compressed size of at least a portion of a given file, and to store an indication of the compressed size in a named stream corresponding to the given file.

In one specific implementation of the system, the file system may be further configured to store a respective compressed size of each of the plurality of files in a corresponding one of a plurality of respective named streams, to compute a compressed size of a concatenated file resulting from appending a first file to a second file, and to determine a value of a file harmony metric from the compressed size of the concatenated file and the stored respective compressed sizes of the first file and the second file.

A method is also contemplated which, in one embodiment, may include storing a plurality of files, computing a compressed size of at least a portion of a given file, and storing an indication of the compressed size in a named stream corresponding to the given file. In one specific implementation, the method may further include storing a respective compressed size of each of the plurality of files in a corresponding one of a plurality of respective named streams, appending a first file to a second file to yield a concatenated file, computing a compressed size of the concatenated file subsequent to the appending, and determining a value of a file harmony metric from the compressed size of the concatenated file and the stored respective compressed sizes of the first file and the second file.

Figure 1:
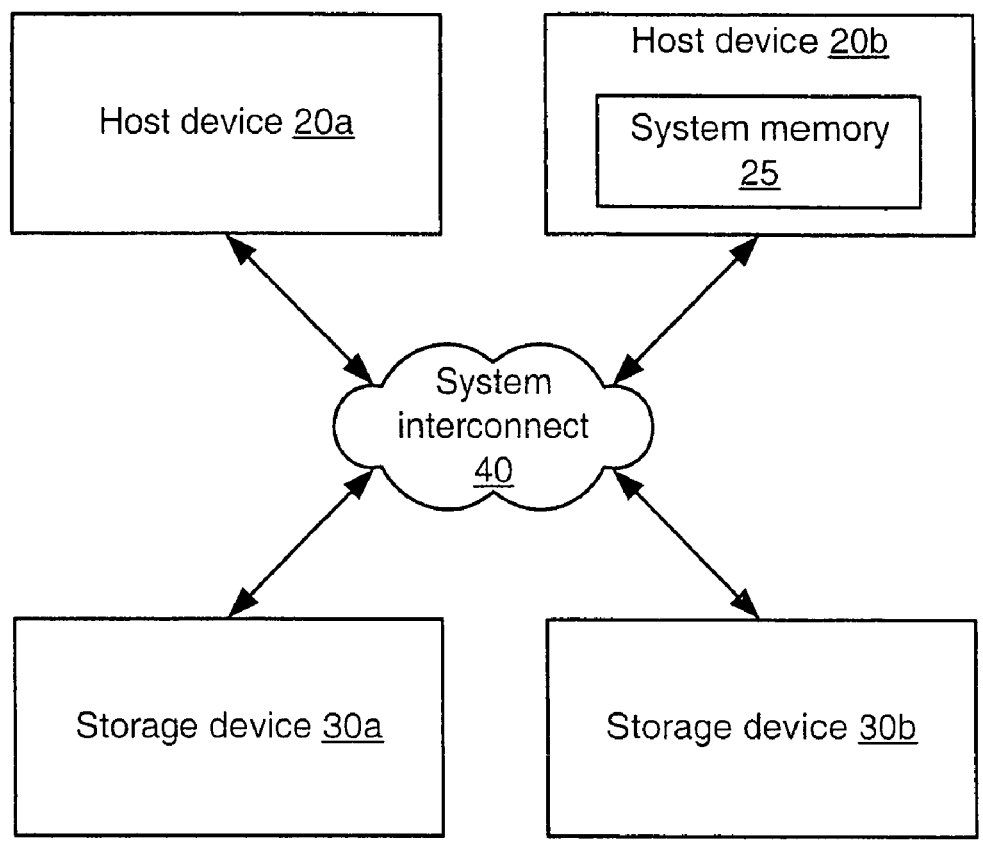
FIG. 1 is a block diagram illustrating one embodiment of a storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Storage System and File System Overview

Turning now to FIG. 1, a block diagram of one embodiment of a storage system is shown. In the illustrated embodiment, storage system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of storage system 10, host devices 20 may be configured to access data stored on one or more of storage devices 30. In one embodiment, storage system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of storage system 10 implemented within a single computer system, storage system 10 may be configured to provide most of the data storage requirements for one or more other computer systems (not shown), and may be configured to communicate with such other computer systems. In an alternative embodiment, storage system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of storage system 10 may facilitate scaling of storage system capacity as well as data bandwidth between host and storage devices.

In still another embodiment, storage system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that storage system 10 may have an arbitrary number of each of these types of devices in alternative embodiments. Also, in some embodiments of storage system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of storage system 10, one or more host devices 20 may be configured to execute program instructions and to reference data, thereby performing a computational function. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in storage system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of storage system 10 as system memory 25. Further, a computer-accessible medium may include transmission media or signals such as electrical, electromagnetic, or digital signals, conveyed via a communication medium such as network and/or a wireless link, which may be included in some embodiments of storage system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix operating system, the Apple Macintosh operating system, or another suitable operating system. Additionally, a given host device may be configured to execute application programs such as word processors, web browsers and/or servers, email clients and/or servers, and multimedia applications, among many other possible applications.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored.

Many operating system embodiments provide data and control structures for organizing the storage space provided by storage devices 30 into files. In various embodiments, the data structures may include one or more tables configured to store information such as, for example, the identity of each file, its location within storage devices 30 (e.g., a mapping to a particular physical location within a particular storage device), as well as other information about each file as described in greater detail below. Also, in various embodiments, the control structures may include executable routines for manipulating files, such as, for example, function calls for changing file identity and for modifying file content as described in greater detail below. Collectively, these data and control structures may be referred to herein as a file system, and the particular data formats and protocols implemented by a given file system may be referred to herein as the format of the file system.

In some embodiments, a file system may be integrated into the operating system such that any access to data stored on storage devices 30 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 2.

Figure 2:
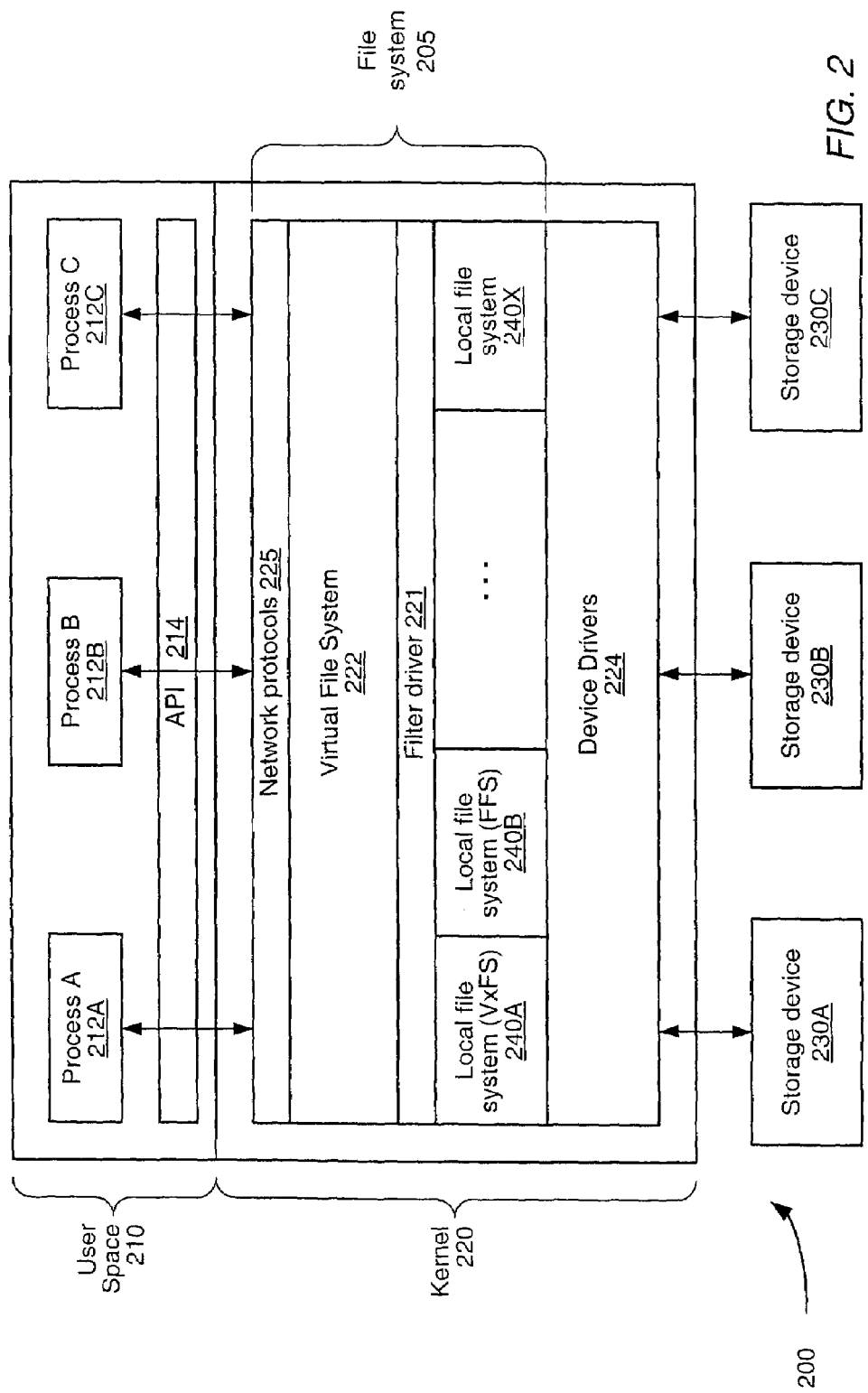
FIG. 2 is a block diagram illustrating one embodiment of an operating system architecture and its interface to storage devices.

FIG. 2 illustrates one embodiment of an operating system architecture and its interface to storage devices. In the illustrated embodiment, operating system 200 includes a user space 210 and a kernel space 220. User space 210 includes a plurality of processes 212A-C, each of which may correspond to a given user application. In some embodiments, some application processes 212 within user space 210 may be distinct from operating system 200. Such processes may be said to operate within an environment provided by operating system 200, or to operate "on top of" operating system 200. Each of processes 212 may be configured to access storage devices 230A-C through calls to application programming interface (API) 214. API 214 provides processes 212 with access to file system 205, which is configured to operate within kernel space 220. In one embodiment, storage devices 230 may be illustrative of storage devices 30 of FIG. 1. Also, in one embodiment, operating system 200, any of its components, and/or any of processes 212 may be configured to execute on one or more host devices 20 of FIG. 1, for example as program instructions and data stored within a computer-accessible medium such as system memory 25 of FIG. 1.

As described above with respect to storage system 10 of FIG. 1, a given host device 20 may reside in a different computer system from a given storage device 30, and may access that storage device via a network. Likewise, with respect to operating system 200, in one embodiment a given process such as process 212A may execute remotely and may access storage devices 230 over a network. In the illustrated embodiment, file system 200 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) format local file system 240A, a fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 212 to a format applicable to the particular local file system 240 targeted by each operation. Additionally, in the illustrated embodiment operating system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store information, such as records or status information, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

It is noted that filter driver 221 is part of file system 205 and not an application or process within user space 210. Consequently, filter driver 221 may be configured to operate independent of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 212. In such embodiments, processes executing in kernel space 220 may be configured to access file system 205 through a kernel-mode API (not shown), in a manner similar to user space processes 212. Thus, in some embodiments, all accesses to storage devices 230 may be processed by file system 205, regardless of the type or space of the process originating the access operation.

Numerous alternative embodiments of operating system 200 and file system 205 are possible and contemplated. For example, file system 205 may support different numbers and formats of local file systems 240, or only a single local file system 240. In some embodiments, network protocol 225 may be omitted or integrated into a portion of operating system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

Comparing File Information Content Using Compression Algorithms

As described above, file system 205 may be configured to manage access to a plurality of files stored on storage devices 230. At any given time, the contents of files stored on storage devices 230 may vary widely, including executable program instructions, text, video and audio data, as well as data formatted for specific application software that may include a mixture of text, numerical data, and/or control data specific to the application format. Generally speaking, files may be said to store information encoded in numerous possible ways.

The information contained in each of any given pair of files (i.e., the content of each file) may be similar to varying degrees. For example, immediately after a file copy operation, the source file and destination file may share information content exactly and thus be exactly similar. An earlier version of a word processor document may share, for example, 90% of the information content of a later version of that document, and may thus be 90% similar to that later version. In some cases, files with dissimilar coding formats may be similar in information content. For example, the information in a given document may be represented in one file as a Microsoft™ Word format document and in a second file as an Adobe™ Portable Document Format (PDF) document. Similarities in information content may also be present across different modes of information representation, such as textual information vs. audio information. For example, two files may represent the information of a given document in text form and in audio form, respectively.

It is possible to determine the degree to which the information content of one file is similar to that of another, regardless of encoding or mode of information representation, by employing a compression algorithm. Generally speaking, compression algorithms remove redundancy in an input information stream, such as repeated data tokens or patterns, thereby producing an output information stream that may be encoded using fewer units of information (e.g., bits in a system employing binary encoding) than the input stream. That is, the compressed size of the information stream may generally be smaller than the native size of the information stream prior to compression. In some embodiments, a compression algorithm may be completely reversible such that the original input stream may be completely reconstructed from the compressed output stream without loss of information; such algorithms may be referred to as lossless compression algorithms. In other compression algorithm embodiments that may be referred to as lossy compression algorithms, the input stream may not be completely reconstructed from the compressed output stream without loss of information.

In one embodiment, a compression algorithm may be employed to determine the information content similarity of two files by determining the compressed size (for example, in bytes) of each file compressed separately, determining the compressed size of the joint file formed by appending one of the two files to the other, and determining a ratio between the compressed size of the joint file and the sum of the compressed sizes of the individual files. For example, if two files share identical information content, an ideal compression algorithm may compress the joint file to a size nearly that of the size of either file compressed alone, since the latter half of the joint file would be entirely redundant with the former half. In such a case, the aforementioned ratio may be approximately 0.5. However, if two files share no information content whatsoever, the compressed size of the joint file may be approximately equal to the sum of the compressed sizes of the individual file, since no additional redundancy would be present in the joint file. In this case, the aforementioned ratio may be approximately 1. It is noted that such a method may be applied to determine a degree of content similarity irrespective of the manner in which the file content is encoded, or whether the two files being compared share the same type of content encoding. Also, it is contemplated that in various embodiments, either lossless or lossy compression algorithms may be employed. (More information regarding use of compression algorithms to determine similarity of information content may be found in, e.g., Benedetto et al., "Language Trees and Zipping," *Physical Review Letters*, vol. 88, no. 4, 28 Jan. 2002.)

File System Support for Compression

In the course of execution, operating system 200 and/or processes 212 may create or modify the information content of one or more files managed by file system 205. For example, a given process such as process 212A may receive data input from a user or another process, such as text or other data. Process 212A may issue a file operation such as a file write operation to cause the data to be saved in a given file. Subsequently, the content of the given file may be compared against one or more other files to determine information content similarity using a compression algorithm as described above.

Figure 3:
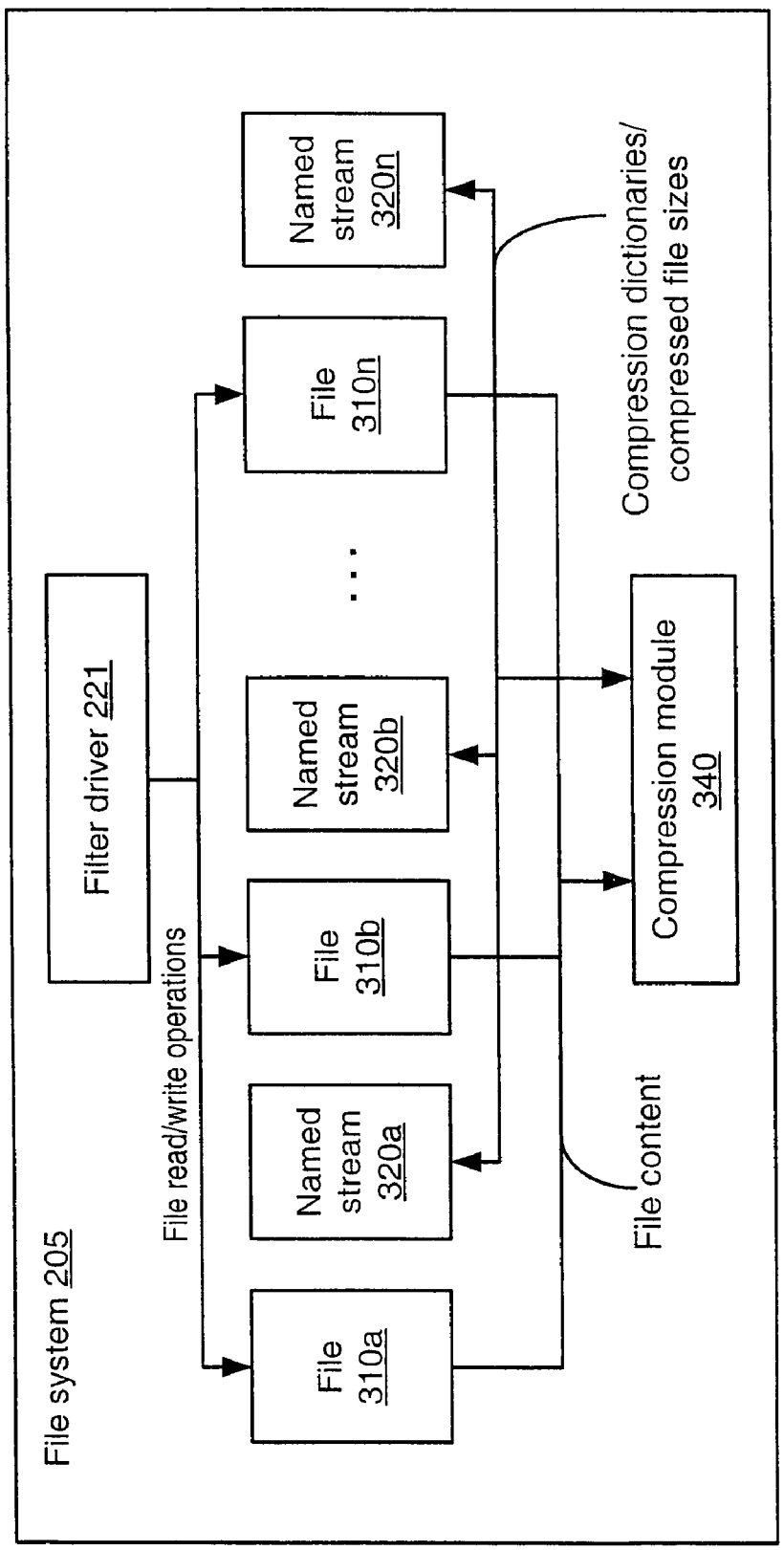
FIG. 3 is a block diagram illustrating one embodiment of a file system configured to compute a compressed size of at least a portion of a given file.

In one embodiment, file system 205 may be configured to compute a compressed size of at least a portion of a given file and to store the compressed size for use in determining information content similarity. FIG. 3 illustrates one such embodiment of a file system. The embodiment of file system 205 shown in FIG. 3 may include those elements illustrated in the embodiment of FIG. 2; however, for sake of clarity, some of these elements are not shown. In the illustrated embodiment, file system 205 includes filter driver 221, an arbitrary number of files 310*a-n*, and a respective named stream 320*a-n* associated with each of files 310*a-n*. File system 205 further includes a compression module 340. It is noted that a generic instance of one of files 310*a-n* or named streams 320*a-n* may be referred to respectively as a file 310 or a named stream 320, and that files 310*a-n* and named streams 320*a-n* may be referred to collectively as files 310 and named streams 320, respectively.

Files 310 may be representative of files managed by file system 205. Each of files 310 has a corresponding named stream 320. Each of named streams 320 may be configured to store information about its corresponding file, which may be referred to herein as metadata. In various embodiments, metadata may include information such as (but not limited to) the file identity, size, ownership, and file access permissions, as well as a compressed size of the corresponding file as well as one or more compression dictionaries used in determining the compressed size of the file, as described in greater detail below. It is noted that files 310 and named streams 320 may be physically stored on one or more storage devices, such as storage devices 230 of FIG. 2. However, for purposes of illustration, files 310 and named streams 320 are shown as conceptually residing within file system 205.

File system 205 may be configured to detect and process file operations that modify the information content of a file 310. In the illustrated embodiment, filter driver 221 may be configured to detect various file operations received by file system 205, and to cause such operations to be processed within file system 205. In one embodiment, all read and write operations received by file system 205 may pass through filter driver 221 in the course of being serviced by file system 205, and in some embodiments, filter driver 221 may monitor the type of operations received and store information regarding those operations within the appropriate named streams 320.

Compression module 340 may be configured as a kernel-mode process operating within file system 205 as shown in FIG. 3, although in some embodiments it is contemplated that compression module 340 may be a kernel-mode process operating externally to file system 205. In the illustrated embodiment, compression module 340 may be configured to scan file system 205 at regular or irregular intervals for files 310 that have been newly created or whose contents have been changed since a previous scan (i.e., files with updated content). For example, in one embodiment filter driver 221 may store an indication, such as a flag, within the named stream 320 of a given file 310 subsequent to detecting an operation to create or modify given file 310. In such an embodiment, compression module 340 may scan for such indications. In another embodiment, compression module 340 may examine file modification and/or file creation timestamps stored within named streams 320 or elsewhere to detect files having updated content. In still another embodiment, subsequent to detecting an operation to create or modify given file 310, filter driver 221 may store a record of the operation including the file identity in a history stream, which may be a named stream associated directly with file system 205 rather than with a particular file 310. In such an embodiment, compression module 340 may be configured to scan the history stream to detect files having changed contents.

Upon detecting a given file 310 having updated content, compression module 340 may be configured to compute a compressed size of the given file 310. For example, compression module 340 may include a built-in compression algorithm, or it may call a routine provided by operating system 200 via a compression library, such as the zlib library. In the illustrated embodiment, compression module 340 may discard the output stream produced as result of compressing the given file 310 and may store the resulting compressed size of file 310 in the corresponding named stream 320. In some embodiments, the employed compression algorithm may create a table of symbols or strings of symbols detected in the input data stream, each symbol or string corresponding to a particular token appearing in the compressed output stream. Such a table may be referred to herein as a compression dictionary or simply a dictionary, and such algorithms may be referred to as dictionary-based algorithms. In some such embodiments, compression module 340 may store a dictionary created during compression of a given file 310 in the corresponding named stream 320, and may further be configured to use such a stored dictionary during subsequent compression operations on given file 310. It is contemplated that in some embodiments, the compressed size of a given file 310 and/or the resulting compression dictionary may be stored in data storage other than a named stream. For example, in one embodiment, either of these items may be stored in a separate file associated with given file 310 but not directly visible to application processes.

In addition to generating and storing compressed sizes of files subsequent to detecting file modification, as just described, compression module 340 may further be configured to respond to requests to determine the similarity in information content between a given file 310 and one or more other files 310. For example, a user may request a determination of similarity of a document stored in a given file to each of a set of documents stored in a respective set of files, or to all files stored within file system 205. Alternatively, a kernel process (which in some embodiments could be compression module 340 itself) may be configured to scan all or a portion of file system 205 at regular or irregular intervals to determine content similarities among large numbers of files. For example, a forensic application may seek to identify patterns of content similarity among files about which little else is known.

In one embodiment, compression module 340 may be configured to receive the identities of the given file 310 and the one or more additional files 310 to which the given file is to be compared. Compression module 340 may append each additional file 310 to the given file 310 in turn to form a concatenated file and may compute a compressed size of each such concatenated file. In some embodiments, compression module 340 may be configured to also reverse the order of file concatenation, compute the compressed size of the reverse-concatenated file, and select the smaller of the resulting compressed size or the compressed size of the original concatenated file. Compression module 340 may further retrieve from the appropriate named streams 320 the compressed size of the given file 310 and each additional file 310, previously computed and stored within those named streams 320 as described above. If the compressed size of a particular file 310 does not exist or is not current (e.g., the particular file was created or modified subsequent to the last scan of compression module 340) when a content similarity comparison involving that file is requested, compression module 340 may compute that file's compressed size responsive to the comparison request.

Once the compressed sizes of two files and their concatenation are available, a file harmony metric may be evaluated with respect to the two files. Generally speaking, a file harmony metric may be any function of the compressed file sizes and the compressed size of the concatenated files, including a ratio as described previously. One exemplary file harmony metric between two files A and B is as follows:

$$FileHarmony(A, B) = \frac{(size(A) + size(B) - \min(size(A|B), size(B|A))) * 100}{size(A) + size(B)},$$

where size(X) represents the compressed size of a given file X and X|Y represents the concatenation resulting from appending file Y to file X. Assuming an ideal compression algorithm, this file harmony metric may range from a minimum value of 0 if the information content of files A and B is completely dissimilar to a maximum value of 50 if the information content of file A is identical to that of file B. Numerous alternative file harmony metric formulations are possible and contemplated, such as unscaled (i.e., fractional) metrics and weighted metrics, for example. It is further contemplated that in some formulations, a file harmony metric may be computed for more than two files at once. For example, the above formula may be extended to an arbitrary number of files by adding their compressed sizes to the numerator and denominator and extending the concatenations accordingly, although the range of such functions may differ depending on how many files are compared. It is noted that if the compressed sizes of individual files A, B, etc. are available at the time the content similarity comparison is requested (for example, the compressed sizes of files A and B were previously computed and stored by compression module 340 as described above), the additional computation required to compute the file harmony metric may be substantially reduced.

It is noted that, like filter driver 221, compression module 340 in the illustrated embodiment is part of file system 205 and not an application or process within user space 210. Consequently, compression module 340 may be configured to operate independent of applications and processes within the user space 210. Alternatively, or in addition to the above, compression module 340 may be configured to perform operations in response to requests received from applications or processes within the user space 210, such as requests to determine content similarity of files. It is further noted that in the illustrated embodiment, the compression and comparison activity performed by compression module 340 as described above occurs in a processing path independent of file read and write operations processed by filter driver 221. That is, file read and write operations processed by filter driver 221 are not dependent on the compression and comparison activity of compression module 340 for their completion. The compression and comparison activity may thus be described as occurring "out of band" with respect to file read and write operations. However, it is contemplated that in an alternative embodiment, the aforementioned functionality of compression module 340 may be wholly or partly implemented by filter driver 221, and may be implemented either "out of band" or "in band" with respect to file read and write operations. For example, in an "in band" implementation, computation of a compressed file size may occur as part of a file write operation, whereby the write operation may not complete until the compressed file size is computed. It is further contemplated that in some embodiments, the functionality of compression module 340 may be implemented entirely within a different software module of file system 205, or among multiple different software modules.

Figure 4A:
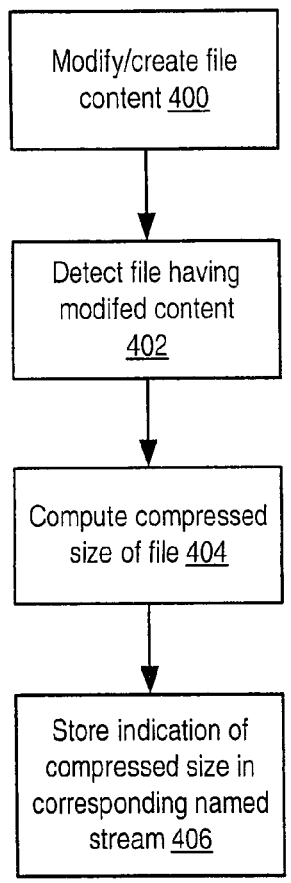
FIG. 4A is a flow diagram illustrating one embodiment of a method of generating and storing compressed sizes of files.
Figure 4B:
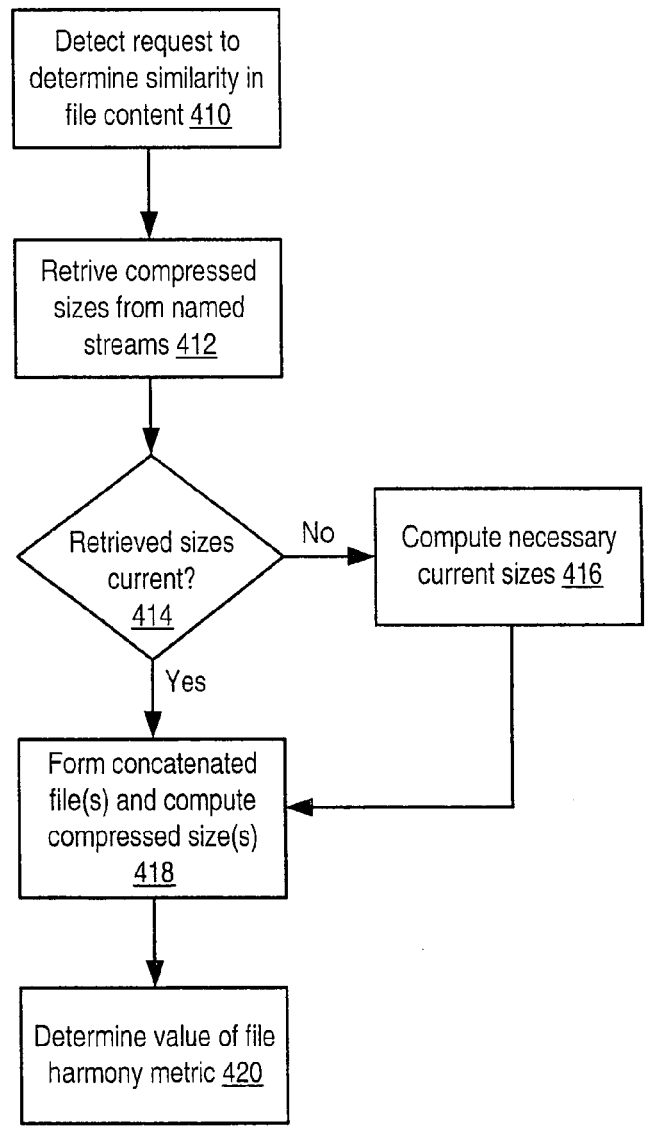
FIG. 4B is a flow diagram illustrating one embodiment of a method of using compressed sizes of files to determine the value of a file harmony metric.

FIG. 4A and FIG. 4B illustrate embodiments of methods of generating and storing compressed sizes of files and of using compressed sizes of files to compute a file harmony metric, respectively. Referring collectively to FIG. 1 through FIG. 4A, operation begins in block 400 where the content of a given file is modified or created. For example, a process such as process 212A may receive user input and request that it be saved to a given file 310 via a file write operation, and file system 205 may process the file write operation. Subsequently, the modified file may be detected (block 402). In one embodiment, compression module 340 may scan the contents of file system 205 to detect modified files by examining file modification timestamps or modification flags set by filter driver 221 during the file write operation, or may scan a history stream as described above, for example.

Subsequent to detection of a modified file, a compressed size of the modified file may be computed (block 404). As described above, in one embodiment compression module 340 may be configured to compute the compressed size of the detected modified file. Once the compressed size has been computed, an indication of the compressed size (such as its value in bytes, for example) may be stored in a named stream corresponding to the file (block 406). As previously noted, in one embodiment compression module 340 may perform the storing, and in some embodiments employing dictionary-based compression algorithms, compression module 340 may also store the resulting compression dictionary in the named stream 320 corresponding to the modified file 310.

The method of FIG. 4B may be configured to operate in parallel with the method of FIG. 4A in some embodiments. For example, in one embodiment, compression module 340 may be configured to perform compression on one file while computing a file harmony metric with respect to that file or a different file. Referring collectively to FIG. 1 through FIG. 3 and FIG. 4B, operation begins in block 410 where a request to determine the similarity in file content of two or more files is detected. For example, such a request could originate from a user process 212A in response to a user request, from a kernel process configured to scan part or all of file system 205 for content similarity patterns as described above, or from another source. In some embodiments, one or more files may be compared for similarity in file content to one or more other files in a pairwise fashion, while in other embodiments, multiple files may be compared simultaneously, according to the specific formulation of the file harmony metric as described above.

Subsequent to detecting such a request, the compressed sizes of the files subject to the request may be retrieved from the named streams corresponding to those files (block 412). For example, in one embodiment compression module 340 may retrieve previously computed compressed sizes of the files 310 subject to the request from named streams 320.

In some instances, one or more compressed sizes corresponding to respective files 310 may not be current or may not exist within named streams 320. For example, a given file 310 may have been modified since its compressed size was last computed, or created after compression module 340 last scanned file system 205. (For simplicity of explanation, a nonexistent compressed size is understood to be not current in the illustrated embodiment.) The retrieved compressed sizes may therefore be checked to determine if they are current (block 414), such as by checking flags, timestamps, or some other mechanism as discussed above. If for any file a compressed size is determined to be not current, a current compressed size may be computed for that file (block 416). It is contemplated that in some embodiments, whether a compressed size is current as in block 414 may be determined prior to retrieving compressed sizes from named streams as in block 412. In such embodiments, compressed sizes may be retrieved from named streams only for files for which compressed sizes are determined to be current, which may reduce the number of accesses to named streams.

In the illustrated embodiment, subsequent to compressed sizes of individual files being retrieved from named streams and/or recomputed, as appropriate, the concatenation of each file with each other file subject to the request may be formed by appending each such file to each such other file. Such concatenation may be performed on pairs of files or greater numbers of files depending on the formulation of the file harmony metric as described previously. Additionally, the compressed size of each such concatenation may be computed (block 418). For example, compression module 340 may be configured in one embodiment to perform the appropriate concatenations of the files 310 subject to the request and to compute compressed sizes of the resulting concatenations. It is contemplated that in some embodiments, this step may be performed prior to or in parallel with the steps of retrieving compressed sizes of files from named streams, determining their currency, and recomputing compressed sizes as needed, as illustrated in blocks 412-416. It is further contemplated that in some embodiments, this step may further include reversing (or permuting, if more than two files are referenced in the file harmony metric) the order of each concatenation, computing a compressed size of each reversed- or permuted-order concatenation, and selecting the smallest compressed size of the various concatenations.

Once compressed sizes for each individual file subject to the request as well as compressed sizes for each appropriate concatenation of such files are available, a value of a file harmony metric may be computed (block 420). For example, in one embodiment compression module 340 may evaluate the FileHarmony(A,B) metric given above. In some embodiments, where multiple pairs or larger sets of files are being compared, a value of a file harmony metric may be determined for each such pair or set. For example, in one embodiment compression module 340 may be configured to determine similarity in content of a given file to each of a set of files, and may determine a value of a file harmony metric for each pairing of the given file with each of the set of files.

Optimized File System Support for Dictionary-based Compression

As described above, when the contents of a given file are modified, a previously computed compressed size corresponding to that file may no longer be valid and may consequently be recomputed. Depending on the compression algorithm employed and the size of the file, the computational effort required to determine the compressed size of an entire file may be substantial. In one embodiment, file system 205 may be configured to reduce the average computational effort required to determine the compressed sizes of files by logically partitioning those files into portions, which may also be referred to herein as chunks.

Figure 5:
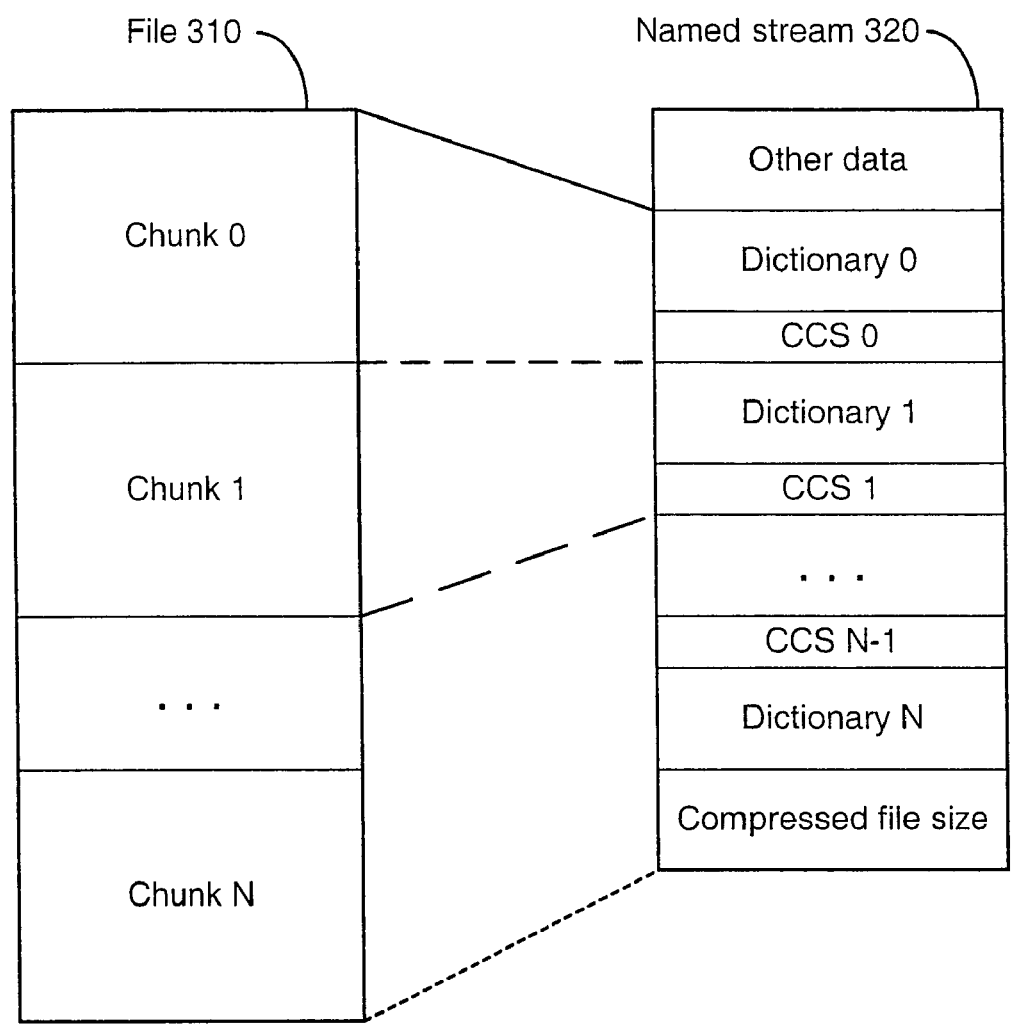
FIG. 5 is a block diagram illustrating one embodiment of a file and a corresponding named stream in an embodiment of a file system configured to logically partition files into chunks.

FIG. 5 illustrates an embodiment of a file 310 and a corresponding named stream 320 as implemented in an embodiment of file system 205 configured to logically partition files into chunks. File 310 and named stream 320 as shown in FIG. 5 may respectively correspond to any of files 310 and named streams 320 shown previously. In the illustrated embodiment, file 310 includes a plurality of chunks designated chunk 0 through chunk N. Named stream 320 includes storage for an indication of the compressed size of file 310, as well as a plurality of compression dictionaries designated dictionary 0 through dictionary N and a plurality of cumulative compressed sizes designated CCS 0 through CCS N−1. In the illustrated embodiment, named stream 320 also includes storage for other metadata corresponding to file 310.

In one embodiment, the chunks included in file 310 may be of a uniform size. For example, each chunk may represent a 64-megabyte (MB) portion of file 310, although other sizes may be used in various embodiments. If file 310 is not an integral multiple of the chunk size, the final chunk (i.e., chunk N) may be smaller than the uniform chunk size in some embodiments, whereas in other embodiments, null data may be appended to the final chunk to render file 310 an integral multiple of the uniform chunk size. In the illustrated embodiment, the chunks included in file 310 may be ordered such that chunk 0 corresponds to the first portion of file 310 (i.e., the portion starting at the beginning of file 310), chunk 1 corresponds to the portion of file 310 contiguously following chunk 0, and so on.

In an embodiment of file system 205 that logically organizes files 310 into chunks such as illustrated in FIG. 5, the operation of compression module 340 may be modified to utilize file chunks. In one embodiment, compression module 340 may be configured to store a compression dictionary as well as a cumulative compressed size corresponding to each chunk of a given file 310 in a corresponding named stream 320. Further, in one embodiment, a given dictionary corresponding to a particular chunk of a file 310 may include all dictionaries corresponding to lower-ordered chunks of the file 310. That is, dictionary N may include the contents of dictionaries 0 through N−1. In one embodiment, compression module 340 may be configured to produce such a set of cumulative or inclusive dictionaries and cumulative compressed sizes by storing its current working compression dictionary and the current compressed file size when a chunk boundary is encountered during compression of file 310. For example, when compression module 340 determines the compressed size of file 310 for the first time, it may begin operating at the beginning of file 310, building a compression dictionary as it progresses. Upon reaching the end of chunk 0, compression module 340 may store its current working compression dictionary and the current working compressed file size in named stream 320 as dictionary 0 and CCS 0, respectively. Compression module 340 may then continue processing file 310, continuing to augment its working compression dictionary and update its working compressed file size as additional input data is encountered, and upon reaching the end of chunk 1, may store its current working compression dictionary (which includes the dictionary symbols corresponding to both chunks 0 and 1) and current working compressed file size (which includes the compressed sizes of both chunks 0 and 1) in named stream 320 as dictionary 1 and CCS 1, respectively. Processing may continue in a similar fashion until the end of file 310 is reached, at which point compression module 340 may store the final working compression dictionary in named stream 320 as dictionary N, and may also store the final computed compressed size of file 310 in named stream 320.

It is also contemplated that in an alternative embodiment, the dictionaries stored in named stream 320 may not be cumulative as described above. Rather, in such an embodiment, compression module 340 may be configured to store in a dictionary corresponding to a given chunk only symbols that have been added to the working compression dictionary since the last chunk boundary was encountered. For example, upon encountering the end of a given chunk K, compression module 340 may store as dictionary K only the symbols that have been added to its current working compression dictionary since the end of chunk K−1 was encountered.

When content of a file 310 organized into logical chunks is modified, such as due to a file write operation, file system 205 may be configured to determine which logical chunk or chunks have been modified. For example, in one embodiment, filter driver 221 may be configured to detect a file write operation to a given file 310. Such a file write operation may include the offset into file 310 at which the write operation is to modify the contents of given file 310 (i.e., the distance from the beginning of given file 310 in terms of bytes, blocks, or some other metric). Given the size of each chunk of given file 310 and the offset of a file write operation into given file 310, filter driver 221 may determine the number of the first chunk modified by the file write operation, such as an arbitrary chunk K. Additionally, given the length of the file write operation, filter driver 221 may determine the number of the last chunk modified by the file write operation, if desired.

Once the first modified chunk of a given file 310 has been determined, in one embodiment, file system 205 may be configured to invalidate the dictionary corresponding to the first modified chunk stored in corresponding named stream 320. File system 205 may also be configured to invalidate dictionaries corresponding to higher-ordered chunks. For example, in one embodiment each dictionary stored within a named stream 320 may include a valid flag (such as a bit or another field defined by the file system architecture) that may be asserted when the respective dictionary is stored by compression module 340. In such an embodiment, filter driver 221 may be configured to deassert the valid flag of the dictionary K corresponding to the first modified chunk K as well as the valid flags of subsequent dictionaries K+1 through N. It is contemplated that in other embodiments, other mechanisms for invalidating dictionaries may be employed. In one embodiment the data structures used to indicate validity of a given stored dictionary may be stored outside of the named stream 320 including those dictionaries, such as within filter driver 221 or another part of file system 205, for example.

Subsequent to modification of given file 310 and invalidation of the appropriate dictionaries, compression module 340 may detect the file modification as described previously. For example, in one embodiment compression module 340 may detect an updated timestamp corresponding to given file 310, a modified flag stored within corresponding named stream 320, or some other mechanism. Upon detecting the modification of given file 310, compression module 340 may be configured to recompute its compressed size. In one embodiment, rather than applying a compression algorithm starting at the beginning of the modified file, compression module 340 may be configured to determine the last chunk of the modified file for which a valid dictionary exists, such as by examining the valid flags of the dictionaries. For example, if the first modified chunk of given file 310 is chunk K, and dictionaries K through N are invalid, chunk K−1 may be the last chunk for which a valid dictionary exists. After determining the last valid dictionary, compression module 340 may be configured to initialize the current working compression dictionary of its compression algorithm from that dictionary (in embodiments where each given directory cumulatively includes each lower-ordered dictionary as described above) or from the set of dictionaries up to and including the last valid dictionary (in embodiments where dictionaries are not inclusive, as described above). Compression module 340 may also initialize its current working compressed file size from the CCS field corresponding to the last valid dictionary. Subsequent to such initialization, compression module 340 may be configured to then recompute the compressed file size beginning with the first modified chunk K, storing updated dictionaries and cumulative compressed file sizes in dictionaries K through N and CCS K through N−1, respectively.

It is noted that in such an embodiment, compressed sizes for chunks 0 through K−1 are not recomputed, thereby potentially reducing the computational effort required to recompute the compressed size of given file 310 following its modification. It is also noted that if chunk 0 of given file 310 is modified, no valid dictionaries may exist, and compression module 340 may begin recomputing the compressed file size from chunk 0 with a default initial dictionary, such as a null dictionary, for example.

In one embodiment employing the aforementioned chunk-based compression techniques, computation of the compressed size of a given file 310 may be accomplished during multiple processing intervals that need not be contiguous. In such an embodiment, compression module 340 may be configured to pause, suspend, or otherwise allow computation of the compressed size of a given file 310 to be interrupted before all dictionaries and the final compressed size of given file 310 have been computed and stored. For example, during a period of high file system or other processing activity, the activity of compression module 340 may be paused to allow more computational resources to be allocated to other processing activity. In such an embodiment, compression module 340 may be configured to indicate that its processing of given file 310 is not complete, such as by storing an indication in corresponding named stream 320. Alternatively, compression module 340 may be configured to scan file system 205 for files with invalid dictionaries when it scans for modified files as described previously. In some embodiments, compression module 340 may be configured to prioritize the completion of interrupted compression processing over other types of operations, such as computing the compressed sizes of newly modified files. In other embodiments, different prioritization schemes may be used.

It is noted that in some embodiments, the organization of files 310 into logical chunks may exist in addition to other types of logical and physical organizations of files 310. For example, operating system 200 may implement a page-based virtual memory system in which storage devices may be organized into virtual and physical pages in addition to logical chunks. Similarly, individual storage devices may be physically organized into sectors that may differ among individual devices. Consequently, in some embodiments a given file 310 may be processed as a plurality of logical chunks for the purpose of determining a compressed file size as described above, a plurality of pages for purposes of virtual memory processing, and a plurality of sectors for purposes of physically accessing the file contents on a particular storage device.

Figure 6:
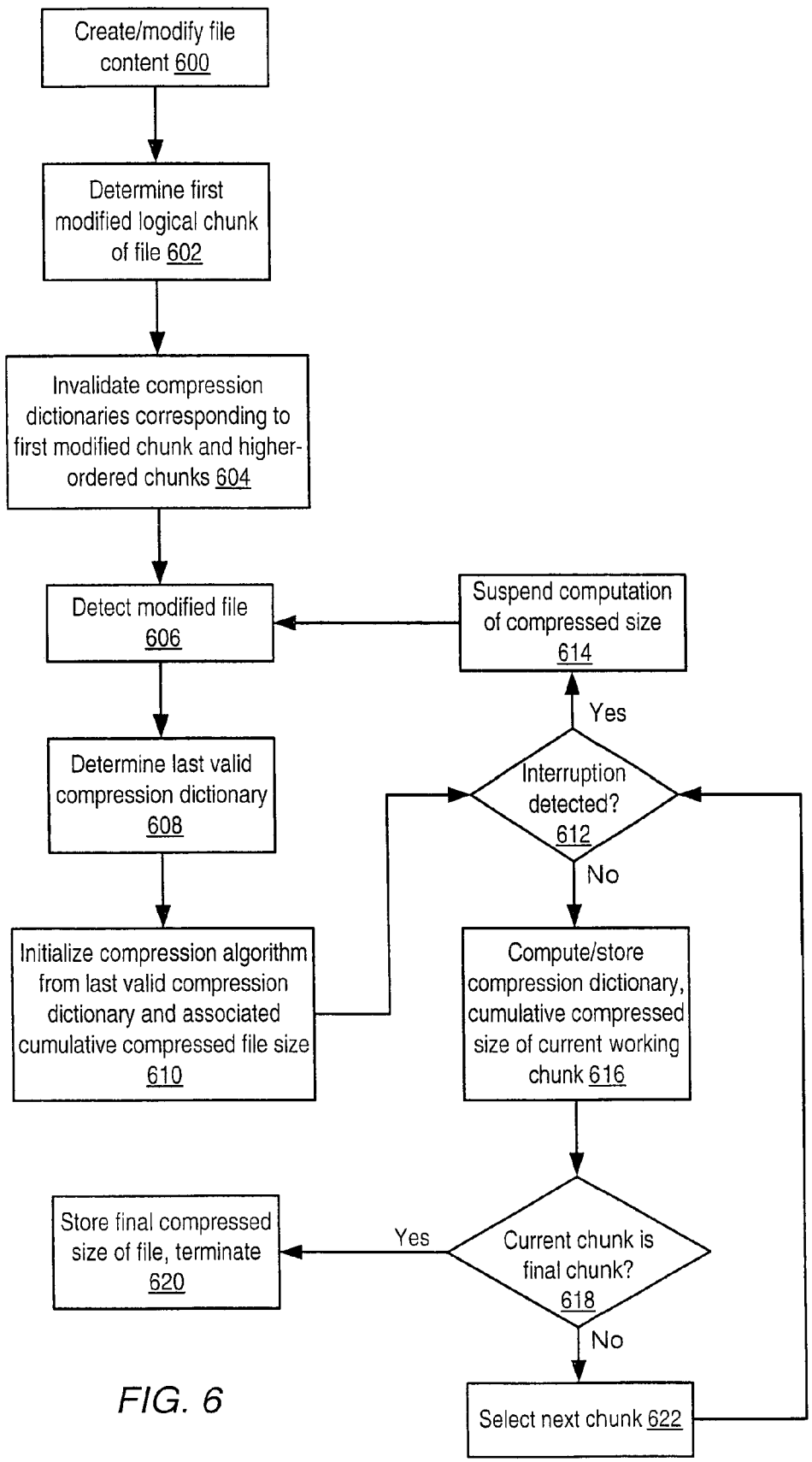
FIG. 6 is a flow diagram illustrating one embodiment of a method of generating and storing a compressed size of a file organized into logical chunks.

FIG. 6 illustrates one embodiment of a method for generating and storing a compressed size of a file organized into ordered portions or logical chunks. Referring collectively to FIG. 1 through FIG. 3, FIG. 5, and FIG. 6, operation begins in block 600 where the content of a given file is modified or created. For example, a process such as process 212A may receive user input and request that it be saved to a given file 310 via a file write operation, and file system 205 may process the file write operation. Subsequent to the file modification, the first modified logical chunk of the modified file may be determined (block 602), and the stored compression dictionary corresponding to the first modified logical chunk as well as any stored compression dictionaries corresponding to logical chunks higher-ordered than the first modified logical chunk may be invalidated (block 604). For example, in one embodiment filter driver 221 may be configured to compute the number of the first modified logical chunk of given file 310 and to invalidate the corresponding dictionaries stored in corresponding named stream 320.

Subsequently, the modified file may be detected (block 606). In one embodiment, compression module 340 may scan the contents of file system 205 to detect modified files by examining file modification timestamps or modification flags set by filter driver 221 during the file write operation, or examining stored compression dictionaries for validity, for example. Upon detecting the modified file, the last valid compression dictionary may be determined (block 608) and the last valid compression dictionary and an associated cumulative compressed file size may be used to initialize a compression algorithm, with the current working chunk of the compression algorithm initialized to the first modified chunk of the modified file (block 610). For example, in one embodiment compression module 340 may examine the dictionaries stored in named stream 320 corresponding to a given modified file 310 to determine the last valid compression dictionary and may initialize its current working compression dictionary and current working compressed file size from the last valid compression dictionary and the corresponding stored CCS value. In embodiments where dictionaries stored in named stream 320 are not inclusive, compression module 340 may initialize its current working compression dictionary from the set of stored dictionaries up to and including the last valid compression dictionary.

Subsequent to initialization, computation of the compressed size of given file 310 may be interrupted (block 612). For example, a higher priority system activity may occur, and compression module 340 may detect the higher priority activity or may receive a software interrupt generated by such an activity. It is noted that in some embodiments, compressed size computation may be interrupted at any point subsequent to detection of the modified file in block 606; however, for simplicity of illustration, such an interruption is shown only after the initialization step.

If an interruption occurs, computation of the compressed size of modified given file 310 may be suspended (block 614) and processing may resume at a later time from block 606, for example when the interrupting activity ceases and given file 310 is again detected to be modified by compression module 340. If no interruption has occurred, processing may proceed from the current working chunk of given file 310, and a compression dictionary and a cumulative compressed size corresponding to the current working chunk of given file 310 may be computed and stored (block 616). For example, in one embodiment compression module 340 may be configured to compress the current working chunk K of given file 310 and, upon reaching the end of the current working chunk K, to store the current working compression dictionary and current working compressed size within named stream 320 as dictionary K and CCS K, respectively. Alternatively, compression module 340 may be configured to store only the difference between the current working compression dictionary and the previously stored dictionary as dictionary K.

Subsequent to processing the current working chunk, the current working chunk may be tested to determine whether it is the final chunk of the file (block 618). If so, the final compressed size of the file may be stored and processing of given file 310 may terminate (block 620). For example, compression module 340 may be configured to store the current working compressed size in named stream 320 as the compressed size of given file 310. If the current working chunk is not the final chunk of the file, the next chunk may be selected as the current working chunk (block 622) and processing may proceed to block 612 where an interruption may be detected, although as noted above, in some embodiments an interruption may be detected at any aforementioned processing step.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   at least one processor;
   a storage device configured to store a plurality of files; and
   a memory storing program instructions, wherein the program instructions are executable by the at least one processor to implement a file system configured to manage access to said storage device, wherein for a given one of said plurality of files including a plurality of ordered portions, said file system is configured to:
   store a plurality of compression dictionaries, wherein each of said plurality of compression dictionaries corresponds respectively to one of said ordered portions of said given file;
   store a plurality of compressed sizes of respective ones of said ordered portions of said given file; and
   in response to detecting a write operation to a given one of said ordered portions of said given file, invalidate one or more of said compression dictionaries corresponding respectively to said given ordered portion and any higher-ordered portions than said given ordered portion of said given file.

2. The system as recited in claim 1, wherein said file system is further configured, subsequent to invalidating said one or more of said compression dictionaries, to recompute a respective compressed size of only said given ordered portion and any higher-ordered portions than said given ordered portion of said given file.

3. The system as recited in claim 2, wherein said file system is further configured to recompute said respective compressed sizes of said given ordered portion and any higher-ordered portions than said given ordered portion dependent upon one or more of said compression dictionaries corresponding respectively to one or more lower-ordered portions than said given ordered portion.

4. The system as recited in claim 1, wherein said file system is further configured, subsequent to invalidating one or more of said compression dictionaries, to update only said invalidated one or more compression dictionaries.

5. The system as recited in claim 1, wherein a given respective compression dictionary corresponding to a higher-ordered portion of said given file includes a given respective compression dictionary corresponding to a lower-ordered portion.

6. The system as recited in claim 1, wherein said file system is further configured to:
   suspend computing a compressed size of a particular ordered portion of said given file; and
   subsequent to said suspending, resume computing said compressed size of said particular ordered portion of said given file without recomputing a compressed size of a lower-ordered portion than said particular ordered portion of said given file.

7. The system as recited in claim 1, wherein said file system is further configured to:
   store a compressed size of a second one of said plurality of files;
   compute a compressed size of a concatenated file resulting from appending said second file to said given file; and
   determine a value of a file harmony metric from said compressed size of said concatenated file, said stored compressed size of said second file, and one or more of said compressed sizes of said ordered portions of said given file.

8. A method, comprising:
   storing a plurality of files; and
   for a given one of said plurality of files including a plurality of ordered portions, storing a plurality of compression dictionaries, wherein each of said plurality of compression dictionaries corresponds respectively to one of said ordered portions of said given file;
   storing a plurality of compressed sizes of respective ones of said ordered portions of said given file; and
   in response to detecting a write operation to a given one of said ordered portions of said given file, invalidating one or more of said compression dictionaries corresponding respectively to said given ordered portion and any higher-ordered portions than said given ordered portion of said given file.

9. The method as recited in claim 8, further comprising:
   subsequent to invalidating said one or more of said compression dictionaries, recomputing a respective compressed size of only said given ordered portion and any higher-ordered portions than said given ordered portion of said given file.

10. The method as recited in claim 9, wherein said recomputing said respective compressed sizes of said given ordered portion and any higher-ordered portions than said given ordered portion is dependent upon one or more of said compression dictionaries corresponding respectively to one or more lower-ordered portions than said given ordered portion.

11. The method as recited in claim 8, further comprising:
    subsequent to invalidating one or more of said compression dictionaries, updating only said invalidated one or more compression dictionaries.

12. The method as recited in claim 8, wherein a given respective compression dictionary corresponding to a higher-ordered portion of said given file includes a given respective compression dictionary corresponding to a lower-ordered portion.

13. The method as recited in claim 8, further comprising:
    suspending computing a compressed size of a particular ordered portion of said given file; and
    subsequent to said suspending, resuming computing said compressed size of said particular ordered portion of said given file without recomputing a compressed size of a lower-ordered portion than said particular ordered portion of said given file.

14. The method as recited in claim 8, further comprising:
    storing a compressed size of a second one of said plurality of files;
    computing a compressed size of a concatenated file resulting from appending said second file to said given file; and
    determining a value of a file harmony metric from said compressed size of said concatenated file, said stored compressed size of said second file, and one or more of said compressed sizes of said ordered portions of said given file.

15. A computer-accessible physical storage medium comprising program instructions, wherein the program instructions are computer-executable to:

store a plurality of files; and for a given one of said plurality of files including a plurality of ordered portions, store a plurality of compression dictionaries, wherein each of said plurality of compression dictionaries corresponds respectively to one of said ordered portions of said given file;

store a plurality of compressed sizes of respective ones of said ordered portions of said given file; and in response to detecting a write operation to a given one of said ordered portions of said given file, invalidate one or more of said compression dictionaries corresponding respectively to said given ordered portion and any higher-ordered portions than said given ordered portion of said given file.

16. The computer-accessible physical storage medium as recited in claim 15, wherein the program instructions are further computer-executable to:

subsequent to invalidating said one or more of said compression dictionaries, recompute a respective compressed size of only said given ordered portion and any higher-ordered portions than said given ordered portion of said given file.

17. The computer-accessible physical storage medium as recited in claim 16, wherein the program instructions are further computer-executable to recompute said respective compressed sizes of said given ordered portion and any higher-ordered portions than said given ordered portion dependent upon one or more of said compression dictionaries corresponding respectively to one or more lower-ordered portions than said given ordered portion.

18. The computer-accessible physical storage medium as recited in claim 15, wherein the program instructions are further computer-executable to:

subsequent to invalidating one or more of said compression dictionaries, update only said invalidated one or more compression dictionaries.

19. The computer-accessible physical storage medium as recited in claim 15, wherein a given respective compression dictionary corresponding to a higher-ordered portion of said given file includes a given respective compression dictionary corresponding to a lower-ordered portion.

20. The computer-accessible physical storage medium as recited in claim 15, wherein the program instructions are further computer-executable to:

suspend computing a compressed size of a particular ordered portion of said given file; and subsequent to said suspending, resume computing said compressed size of said particular ordered portion of said given file without recomputing a compressed size of a lower-ordered portion than said particular ordered portion of said given file.

21. The computer-accessible physical storage medium as recited in claim 15, wherein the program instructions are further computer-executable to:

store a compressed size of a second one of said plurality of files;

compute a compressed size of a concatenated file resulting from appending said second file to said given file; and determine a value of a file harmony metric from said compressed size of said concatenated file, said stored compressed size of said second file, and one or more of said compressed sizes of said ordered portions of said given file.

* * * * *